UNITED STATES PATENT OFFICE.

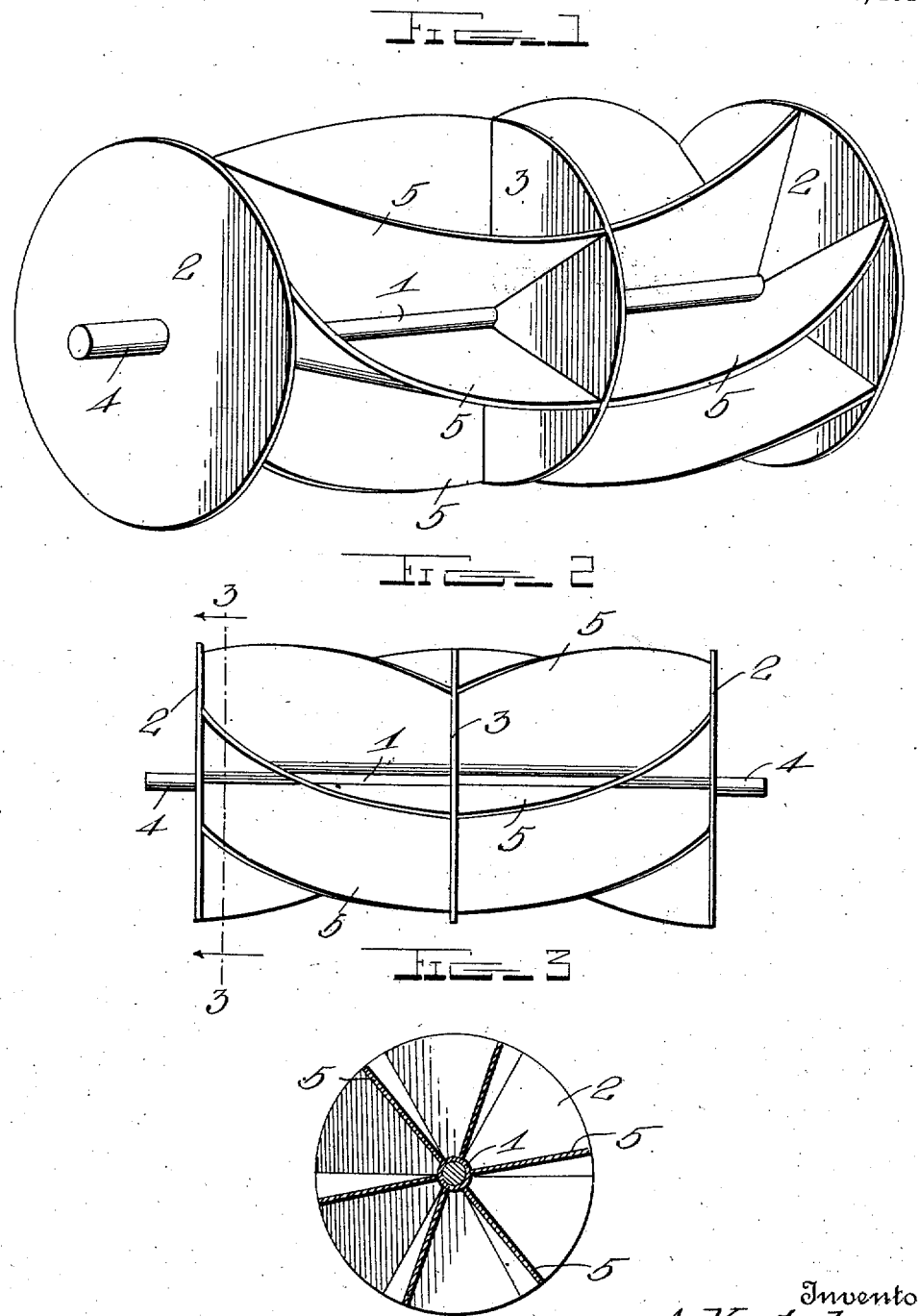

ALBERT VESTAL AND DELBERT F. BENNETT, OF REDDING, CALIFORNIA.

CURRENT-MOTOR.

973,241.   Specification of Letters Patent.   Patented Oct. 18, 1910.

Application filed February 24, 1910. Serial No. 545,659.

*To all whom it may concern:*

Be it known that we, ALBERT VESTAL and DELBERT F. BENNETT, citizens of the United States, residing at Redding, in the county of Shasta and State of California, have invented certain new and useful Improvements in Current-Motors; and we do declare the following to be a full, clear, and exact description of the invention, such as will enable others skilled in the art to which it appertains to make and use the same.

This invention relates to improvements in current motors or water wheels.

One object of the invention is to provide an improved construction of water wheel in which all of the weight of the flow or current of the water coming into contact with the buckets or blades of the wheel will be utilized, said buckets or blades being formed to concentrate this weight from the ends to the center of the wheels.

Another object is to provide a water wheel, the blades or buckets of which are so formed that they are in commission for power as soon as they enter the water and which carry no dead weight of water in coming out of the stream.

With the foregoing and other objects in view, the invention consists of certain novel features of construction, combination and arrangement of parts, as will be more fully described and particularly pointed out in the appended claim.

In the accompanying drawings, Figure 1 is a side view of a current water wheel constructed in accordance with the invention. Fig. 2 is a vertical cross sectional view of the same. Fig. 3 is a transverse section taken upon the line 3—3 of Fig. 2.

Our improved water wheel comprises a hub 1 having secured on its opposite ends circular disks or plates 2 and intermediate its ends a circular disk or plate 3. On the opposite ends of the shaft are also secured trunnions 4, whereby the wheel may be mounted in a suitable supporting frame (not shown.)

Arranged on the hub of the wheel between the opposite sides of the central disk 3 and the end disks 2 are a series of radially projecting blades or buckets 5, said blades or buckets being formed on a slight spiral curve from the ends of the wheel to the central disk 3, the inner ends of the blades where they join the disk 3 being thus in rear of the outer ends of the blades so that the current of water striking the blades is directed or concentrated toward the center of the wheel which point consequently receives the greatest power or force of the current. From this construction and arrangement of the blades, it will also be seen that when the blades leave the water the latter runs rapidly from the rear side thereof so that no dead weight of water is carried around by the wheel as the blades come out of the stream.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claim.

Having thus described our invention what we claim as new is:—

A current-motor comprising a central hub-member, a series of blades standing radially to said hub-member, end disk-members and an intermediate disk-member, said blades being secured to said hub-member and said end and intermediate disk-members and curved longitudinally of the motor, said intermediate disk-member intersecting said blades about centrally of their longitudinal curvatures.

In testimony whereof we have hereunto set our hands in presence of two subscribing witnesses.

ALBERT VESTAL.
DELBERT F. BENNETT.

Witnesses:
  JAMES E. ISAACS,
  ALFRED BALTZELL.